Patented July 4, 1950

2,514,217

UNITED STATES PATENT OFFICE 2,514,217

RUBBER COMPOSITIONS AND PROCESS OF PRODUCING SAME

Joseph C. Ambelang, Akron, Ohio, assignor to The Firestone Tire & Rubber Company, Akron, Ohio, a corporation of Ohio No Drawing. Application October 29, 1947, Serial No. 782,943

8 Claims. (Cl. 260—810)

This invention relates to natural rubber compositions which contain antiflex-cracking agents. These antiflex-cracking agents are stannous alkylated catecholates in which the number of the carbon atoms in the alkyl substituent or substituents is at least eight.

The tendency of white side-wall tires to crack in use has retarded their adoption. Certain of the agents which have been found to retard such cracking (called antiflex-cracking agents) discolor the side walls. A satisfactory antiflex-cracking agent for white side walls must be non-discoloring.

Stannous catecholate and the lower hydrocarbon-substituted derivatives, such as stannous dimethylcatecholate and stannous cyclohexylcatecholate, are ineffective as antiflex-cracking agents. However, the higher alkylated compounds have been found to be excellent antiflex-cracking agents and are non-discoloring. Illustrative of the antiflex-cracking agents of this invention are:

Stannous di-tert.-butycatecholate
Stannous octylcatecholate
Stannous octyl-4-methylcatecholate
Stannous diamylcatecholate
Stannous nonylcatecholate
Stannous heptyl-4-methylcatecholate
Stannous dodecylcatecholate
Stannous dihexylcatecholate
Stannous decylcathecholate It appears that such higher alkyl substituents render these stannous catecholates more soluble in the natural rubber than the unalkylated or lower alkylated compounds and thus make the presence of the stannous compound effective.

The following examples illustrate the production of the alkylated compounds:

EXAMPLE 1

*Stannous octylcatecholate*

Octylcatechol, 9.5 grams, was dissolved in methanol with 9.6 grams of stannous chloride hydrate. Into this solution with mechanical stirring were dropped 3.4 grams of sodium hydroxide in 125 ml. of 30 per cent aqueous methanol. An equal volume of water was added. The precipitate was filtered, washed with aqueous alcohol, and then water, and dried at 75° C. The yield was 13.3 grams.

EXAMPLE 2

*Stannous di-tertiary-butylcatecholate*

Di-tertiary-butylcatechol, 15.0 grams, and 15.1 grams of stannous chloride hydrate were dissolved in 150 ml. of methanol. A solution of 5.35 grams of sodium hydroxide in 150 ml. of 30 per cent methanol was dropped in with stirring. Two 100 ml. portions of water were added. The precipitate was filtered, washed with methanol and water, and dried 4 hours at 75° C. The yield was 21.3 grams.

The stannous catecholates were compounded in a usual formula for white side-wall tires, as follows:

|  | A | B | Blank |
|---|---|---|---|
| Pale crepe rubber | 100 | 100 | 100 |
| Wax | 2 | 2 | 2 |
| Ultramarine | 0.1 | 0.1 | 0.1 |
| Zinc oxide | 72 | 72 | 72 |
| Titanium dioxide | 20 | 20 | 20 |
| Sulfur | 3.1 | 3.1 | 3.1 |
| Accelerator | 0.4 | 0.4 | 0.4 |
| Activator | 0.5 | 0.5 | 0.5 |
| Stearic Acid | 1.2 | 1.2 | 1.2 |
| Stannous octylcatecholate | 1.0 | 0 | 0 |
| Stannous di-tert.-butylcatecholate | 0 | 1.0 | 0 |

The wax was of the type commonly used in such compounds to produce a bloom which protects the white side walls. The ultramarine serves only as a dye. The accelerator was benzothiazyl disulfide. The activator was dibutylammonium oleate. Test samples cured 20, 40, and 60 minutes, respectively, at 280° F. were tested in flexing equipment designed for the purpose with the following average results:

|  | Flex Life Hours | Cracks per Hour |
|---|---|---|
| Sample A | 51.22 | 3.1 |
| Sample B | 58.38 | 2.6 |
| Blank | 39.60 | 7.5 |

The "cracks per hour" is the average rate of crack formation.

After natural weathering for 8 weeks and after 4 hours' artificial weathering (carbon arcs, no filters), neither of the two stabilized materials nor the blank showed any discoloration.

The above examples are illustrative of the invention and are not to be interpreted as limiting the invention to the details given. Various compounding ingredients may be used, and it is not essential that a white pigment be employed or that the rubber be used in tires. The amount of antiflex-cracking agent employed may vary from about 0.5 up to about 8 parts per 100 parts of rubber or more. Various changes in compounding and procedure, etc., may be made without

What I claim is:

1. Natural rubber vulcanizate which contains as an antiflex-cracking agent a small amount of a stannous catecholate which is substituted with at least one alkyl substituent and the number of carbon atoms in the alkyl substituents of which totals at least eight.

2. White natural rubber vulcanizate pigmented with titanium dioxide which contains as an antiflex-cracking agent a small amount of a stannous catecholate which is substituted with at least one alkyl substituent and the number of carbon atoms in the alkyl substituents of which totals at least eight.

3. White natural rubber pigmented with titanium dioxide which contains as an antiflex-cracking agent a small amount of stannous octylcatecholate.

4. White natural rubber pigmented with titanium dioxide which contains as an antiflex-cracking agent a small amount of stannous di-tertiary-butylcatecholate.

5. The process of curing natural rubber which comprises curing the same in the presence of a small amount of an antiflex-cracking agent which is a stannous catecholate which is substituted with at least one alkyl substituent and the number of carbon atoms in the alkyl substituents of which totals at least eight.

6. The process of producing white natural rubber vulcanizate which comprises curing natural rubber stock pigmented with titanium dioxide and containing as an antiflex-cracking agent a stannous catecholate which is substituted with at least one alkyl substituent and the number of carbon atoms in the alkyl substituents of which totals at least eight.

7. The process of producing white natural rubber vulcanizate which comprises curing natural rubber stock pigmented with titanium dioxide and containing as an antiflex-cracking agent a small amount of stannous octylcatecholate.

8. The process of producing white natural rubber vulcanizate which comprises curing natural rubber stock pigmented with titanium dioxide and containing as an antiflex-cracking agent a small amount of stannous di-tertiary-butylcatecholate.

JOSEPH C. AMBELANG.

REFERENCES CITED

The following references are of record in the file of this patent:

UNITED STATES PATENTS

| Number | Name | Date |
|---|---|---|
| 2,310,449 | Lightbown et al. | Feb. 9, 1943 |
| 2,334,470 | Armstrong | Nov. 16, 1943 |
| 2,335,089 | Sibley | Nov. 23, 1943 |
| 2,445,367 | Robey et al. | July 20, 1948 |

FOREIGN PATENTS

| Number | Country | Date |
|---|---|---|
| 526,072 | Great Britain | Sept. 10, 1940 |